June 28, 1955 L. G. SIMJIAN 2,711,606

METHOD FOR MAKING RELIEF MAPS

Filed Feb. 11, 1953

INVENTOR.

LUTHER G. SIMJIAN

BY Ervin B. Steinberg
agent

United States Patent Office 2,711,606
Patented June 28, 1955

2,711,606

METHOD FOR MAKING RELIEF MAPS

Luther G. Simjian, Greenwich, Conn., assignor to The Reflectone Corporation, Stamford, Conn., a corporation of Connecticut Application February 11, 1953, Serial No. 336,245

5 Claims. (Cl. 41—24)

This invention concerns a method for making relief maps and has particular reference to a method for making relief maps from a photographic image.

Although there are many methods for making relief maps, a most widely used process employs the steps of first making a relief mold of the desired terrain. Then, a sheet of deformable material is applied to the mold and by way of pressure, vacuum, heat or the combination thereof, this sheet is forced to follow the contours of the mold. The deformable sheet may be made of a thermoplastic material or some other suitable material which deforms in a suitable manner by curving, bending, stretching or the combination thereof as may be required in order that the sheet closely follows the contours of the mold. After the sheet has attained the desired configuration it is removed from the mold and if it is provided with sufficient strength to support itself, the sheet will retain the configuration imparted thereupon. As a next step the sheet is sensitized with a suitable photographically-sensitive emulsion, as for instance a mixture of gelatin and silver compounds, such as is well known in the photographic art. This emulsion then is exposed by projection to the photograph after which the mold was patterned. After developing, fixing and dyeing, the relief map thus obtained closely simulates the appearance of the actual terrain as viewed from aloft.

The method described above is afflicted with several shortcomings. Because of projecting from a plane sheet upon a relief map having distinct elevations and depressions there is a considerable amount of distortion and parallax. Also, it is rather difficult to obtain the necessary photographic exposure in narrow depressions, especially if such depressions are adjacent to comparatively high elevations.

One of the objects of this invention is therefore to provide an improved method for making relief maps which avoids one or more of the disadvantages and limitations of prior art arrangements.

Another object of the invention is the method of using a pre-sensitized sheet, thereby simplifying the reproduction process.

A still further object of the invention is the provision of an image on the deformable sheet which is composed of a plurality of discrete portions thereby permitting the sheet to be deformed after the photographic image has been reproduced.

A still further object of the invention is to reduce the cost of producing relief maps when average size quantities are to be produced.

One of the features of the present invention for making relief maps includes the steps of supporting a deformable sheet in a flat position. Then an image is applied to the sheet in such a manner as to cause an image composed of a plurality of image portions. Finally the sheet is deformed to cause it to follow the contours to which it is applied.

For a better understanding of the present invention, together with other and further objects thereof, reference is made to the following description taken in connection with the accompanying drawings, in which Figure 1 is a typical arrangement of discrete image portions on the image carrying sheet.

As used throughout the specification and claims "image portions" are defined as portions of the picture which have an area equal to or less than one per cent of the total picture area.

Figure 1:
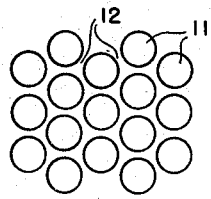
Figure 2:
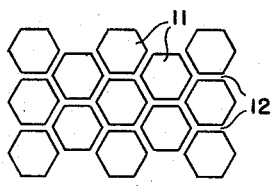
Figure 2 is still another typical arrangement of discrete image portions.
Figure 3:
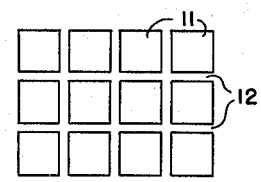
Figure 3 is a still further typical arrangement of discrete image portions.

As described above, the most widely used process of making relief maps comprises the photographic reproduction of an image on a sheet. The inability of the photographically-sensitive emulsion, usually a gelatin base mixed with silver compounds, to distort or stretch without severe cracking or tearing of the photographic image prevents the deforming of a pre-sensitized sheet. In order to practice the subject invention which includes the deforming of a flat sheet to which an image has been applied, it is necessary to resolve the image into a plurality of image portions. Referring to Figures 1, 2 and 3 there are shown several typical arrangements of discrete image portions 11 separated by blank portions 12. These image portions 11 shown in a greatly enlarged scale are applied on a sheet which may be made of sheet material having a thermoplastic base or a vinyl-plastic base or any similar material which is deformable by way of bending, curving, stretching or a combination thereof. The photographically-sensitive emulsion may be applied to this sheet in several ways, one method of which may comprise the coating of the sheet with discrete islands of photographic emulsion as shown in Figures 1, 2 and 3, or by applying a continuous layer of a photographically-sensitive emulsion and separating said continuous emulsion into a plurality of islands by mechanical separation of the continuous layer or by other methods as are well known in the art.

After the sheet has been coated with discrete islands of a photographically-sensitive emulsion, the aerial photograph is projected thereupon thereby exposing the emulsion. In the following steps, the emulsion is developed, hardened and dried in the conventional manner followed by dyeing to simulate terrain as may be applicable.

As a next operation the sheet with the image transferred thereupon as described above is set over a previously prepared relief mold. By means of pressure, vacuum, heat or other suitable means or combination thereof, the sheet is caused to follow the contours of the relief mold. When the deforming of this sheet takes place it will be observed that the portions free of photographically-sensitive emulsion will demonstrate greater flexibility than the image carrying portions by virtue of the absence of the hardened, substantially inflexible gelatin layer. Consequently, the portions which are free of any image will deform by flexing, bending, or stretching without cracking or tearing the image carrying portions which will retain their general character. The image therefore is in good condition with its resolution limited only by the number of discrete image portions per unit area. If the base material has sufficient strength to support itself, the sheet may be lifted off the relief mold which in turn becomes available for use with further sheets.

Figure 4:
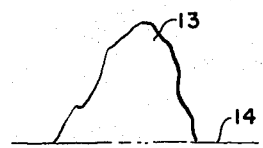
Figure 4 is a typical vertical elevation as may occur on a relief map.
Figure 5:
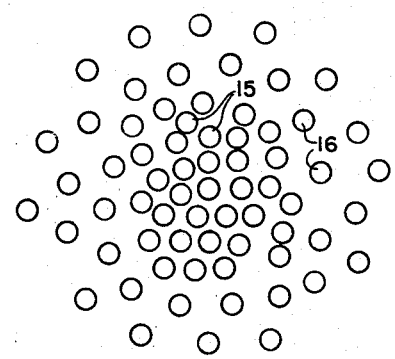
Figure 5 is an arrangement of discrete image portions for use in connection with the elevation shown in Figure 4.

When a considerable amount of yielding or stretching is required as for instance in connection with a relatively large elevation, such as a mountain 13 in Figure 4 arising from a plain 14, it is possible to arrange a higher density of the image pattern for that area which has to stretch over the elevation compared with the image portions which will come to rest on the flat surface. Such an unequal dispersal is indicated in Figure 5 wherein the center of the pattern has a greater number of image portions 15 per unit area than the surrounding area's image portions 16. In such a manner the picture resolution is intensified in those areas where greater deformation is to occur thereby providing also a greater number of points or areas for deformation. When deforming the sheet, the intensified area will deform and stretch to a greater extent and assume the general picture quality of the over-all relief map. The image intensification which may be achieved by familiar masking methods can be adapted in varying degrees suited to the respective elevations.

Figure 6:
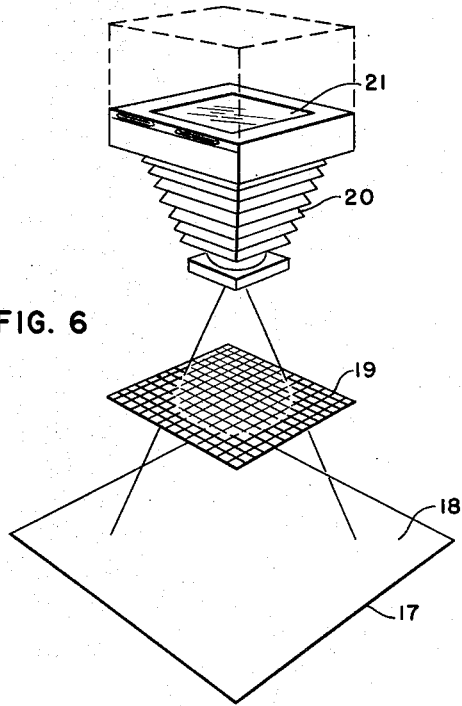
Figure 6 is a typical method for obtaining discrete exposed image portions.

In Figure 6 a still further method of photographic reproduction is shown. A sheet 17 is coated with a continuous layer 18 of a photographically-sensitive emulsion which is composed of a mixture of photo-engravers glue and dichromated albumen. Such emulsions often also called "resist" coatings, are well known in connection with photo-engraving of metallic parts. Above the sheet carrying this coating there is disposed a mesh or screen 19 which may be a wire mesh with a suitable percentage of open area. A transparent negative 21 disposed in the enlarger 20 is projected upon the photographically-sensitive emulsion through the screen 19. Wherever the emulsion is exposed to light it hardens and becomes insoluble to water, but wherever the mesh of screen 19 blocked the light exposure, the emulsion remains water-soluble and thus may be washed off. In such a way an image composed of discrete image portions may be readily obtained. A simple, inexpensive wire screen with wires at 90 degrees to one another will result in a pattern as shown in Figure 3. After drying and/or baking of the hardened emulsion the sheet can be readily deformed as described above. When making a screen with variable screen mesh spacing or by superimposing or partial superimposing of two or more screens, a varying screen pattern as shown in Figure 5 may be readily obtained. Also, contact printing may be employed with the screen, negative and emulsion in close proximity to one another without departing from the spirit of the invention.

It will be obvious to those skilled in the art that this method is not only restricted to making relief maps but may be advantageously adapted for other three-dimensional models as used in connection with displays, advertising signs and the like.

While there have been described and illustrated specific embodiments of the invention, it will be obvious that various changes and modifications may be made therein without departing from the field of the invention which should be limited only by the scope of the appended claims.

What is claimed is:

1. A method for making relief maps wherein a deformable thermoplastic sheet is applied upon a relief comprising the steps of coating said sheet with a photographically sensitive emulsion, supporting said sheet in a flat position, projecting a photographic image upon said emulsion in a manner to produce a plurality of discrete exposed image portions, removing the emulsion from the non-exposed portions, developing and hardening the emulsion of the exposed image portions thereby obtaining a differentially yieldable sheet and deforming said sheet by means of heat to cause it to follow the contours of the relief to which it is applied.

2. A method for making relief maps wherein a deformable thermoplastic sheet is applied upon a relief comprising the steps of coating said sheet with a photographically sensitive emulsion, supporting said sheet in a flat position, projecting a photographic image upon said emulsion in a manner to produce a plurality of discrete exposed image portions, developing and hardening the emulsion of the discrete image portions thereby rendering the image carrying portions of said sheet less yieldable than the image-free portions and deforming said sheet by means of heat and pressure to cause it to follow the contours of the relief to which it is applied.

3. A method for making relief maps wherein an object is reproduced on a deformable thermoplastic sheet and the sheet is applied upon a relief comprising the steps of coating said sheet with a photographically-sensitive emulsion, supporting said sheet in a flat position, disposing a screen between said emulsion and the object to be reproduced, projecting through said screen a photographic image upon said emulsion to produce on said sheet an image which is composed of a plurality of discrete exposed portions separated by non-exposed portions, developing and hardening the exposed portions of the emulsion thereby rendering said sheet differentially yieldable in a manner that the image carrying portions of the sheet are less yieldable than the image free portions and deforming said sheet to cause it to follow the contours of the relief to which it is applied.

4. A method for making relief maps wherein a deformable thermoplastic sheet is applied upon a relief comprising the steps of coating said sheet with a photographically-sensitive emulsion adapted to harden upon the exposure to light, supporting said sheet in a flat position, projecting a photographic image upon said emulsion in such a manner to cause a plurality of discrete exposed portions, developing said photographic emulsion and deforming said sheet by means of heat and pressure to cause it to follow the contours of the relief to which it is applied whereby the light exposed portions of said sheet are less yieldable than the non-exposed portions.

5. A method for making relief maps wherein an object is reproduced on a deformable thermoplastic sheet and the sheet is applied upon a relief comprising the steps of coating said sheet with a photographically-sensitive emulsion, supporting said sheet in a flat position, disposing a screen having varying mesh spacing between said emulsion and the object to be reproduced, projecting the image upon said emulsion thereby causing on said sheet an image composed of a plurality of discrete exposed portions separated by non-exposed portions, developing and hardening the image carrying portions of said emulsion thereby rendering said sheet differentially yieldable in a manner that the image carrying portions of the sheet are less yieldable than the image-free portions and deforming said sheet by means of heat and pressure to cause it to follow the contours of the relief to which it is applied.

References Cited in the file of this patent

UNITED STATES PATENTS

| | | |
|---|---|---|
| 2,468,731 | Borkland | May 3, 1949 |
| 2,577,984 | Warnecke | Dec. 11, 1951 |

OTHER REFERENCES

Modern Photoengraving, Flader et al., page XXX, par. 3, Mod. Photo Pub. Co. Cpw. 1948.